United States Patent
Oroskar et al.

(10) Patent No.: US 8,843,162 B2
(45) Date of Patent: *Sep. 23, 2014

(54) INTELLIGENT PAGING-CHANNEL SCANNING BASED ON LOCATION RELATIVE TO ZONE OF LAST REGISTRATION

(71) Applicant: Sprint Spectrum L.P., Overland Park, KS (US)

(72) Inventors: Siddharth S. Oroskar, Overland Park, KS (US); Sachin R. Vargantwar, Macon, GA (US); Jasinder P. Singh, Olathe, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/766,346

(22) Filed: Feb. 13, 2013

(65) Prior Publication Data

US 2013/0165113 A1  Jun. 27, 2013

Related U.S. Application Data

(63) Continuation of application No. 12/914,998, filed on Oct. 28, 2010, now Pat. No. 8,391,897.

(51) Int. Cl.
*H04W 68/00* (2009.01)
*H04W 68/08* (2009.01)
*H04W 60/00* (2009.01)

(52) U.S. Cl.
CPC .............. *H04W 60/00* (2013.01); *H04W 68/08* (2013.01)

USPC ........... 455/458; 455/574; 455/515; 455/434; 455/343.1; 455/343.2; 455/343.3; 455/343.5

(58) Field of Classification Search
USPC ........... 455/458, 574, 515, 434, 343.1, 343.2, 455/343.3, 343.5
See application file for complete search history.

(56) References Cited

U.S. PATENT DOCUMENTS

| 7,047,005 | B2 | 5/2006 | Kinnavy |
| 2003/0114156 | A1* | 6/2003 | Kinnavy ...................... 455/434 |
| 2008/0280607 | A1* | 11/2008 | Kanto et al. ................ 455/435.1 |
| 2008/0293437 | A1* | 11/2008 | Ranganathan et al. ........ 455/458 |
| 2009/0156271 | A1* | 6/2009 | Islam et al. .................... 455/574 |
| 2009/0298437 | A1* | 12/2009 | Hoefel et al. ............... 455/67.11 |
| 2010/0273482 | A1* | 10/2010 | Jain et al. ................... 455/435.1 |

* cited by examiner

*Primary Examiner* — Barry Taylor

(57) ABSTRACT

Exemplary methods and systems are disclosed herein that may, among other benefits, help a mobile station to conserve power by intelligently determining how often to scan for incoming pages. An exemplary method may be carried out by a mobile station that has most-recently registered with a radio access network in a zone of last registration, and involves the mobile station (a) determining a location of the mobile station in relation to the zone of last registration, (b) using the location of the mobile station in relation to the zone of last registration as a basis for determining a scan period to wait between scans of the paging channel; and (c) periodically scanning the paging channel according to the determined scan period. Furthermore, an exemplary method may be carried out in order to conserve battery power when a mobile station determines that its battery power is low.

20 Claims, 7 Drawing Sheets

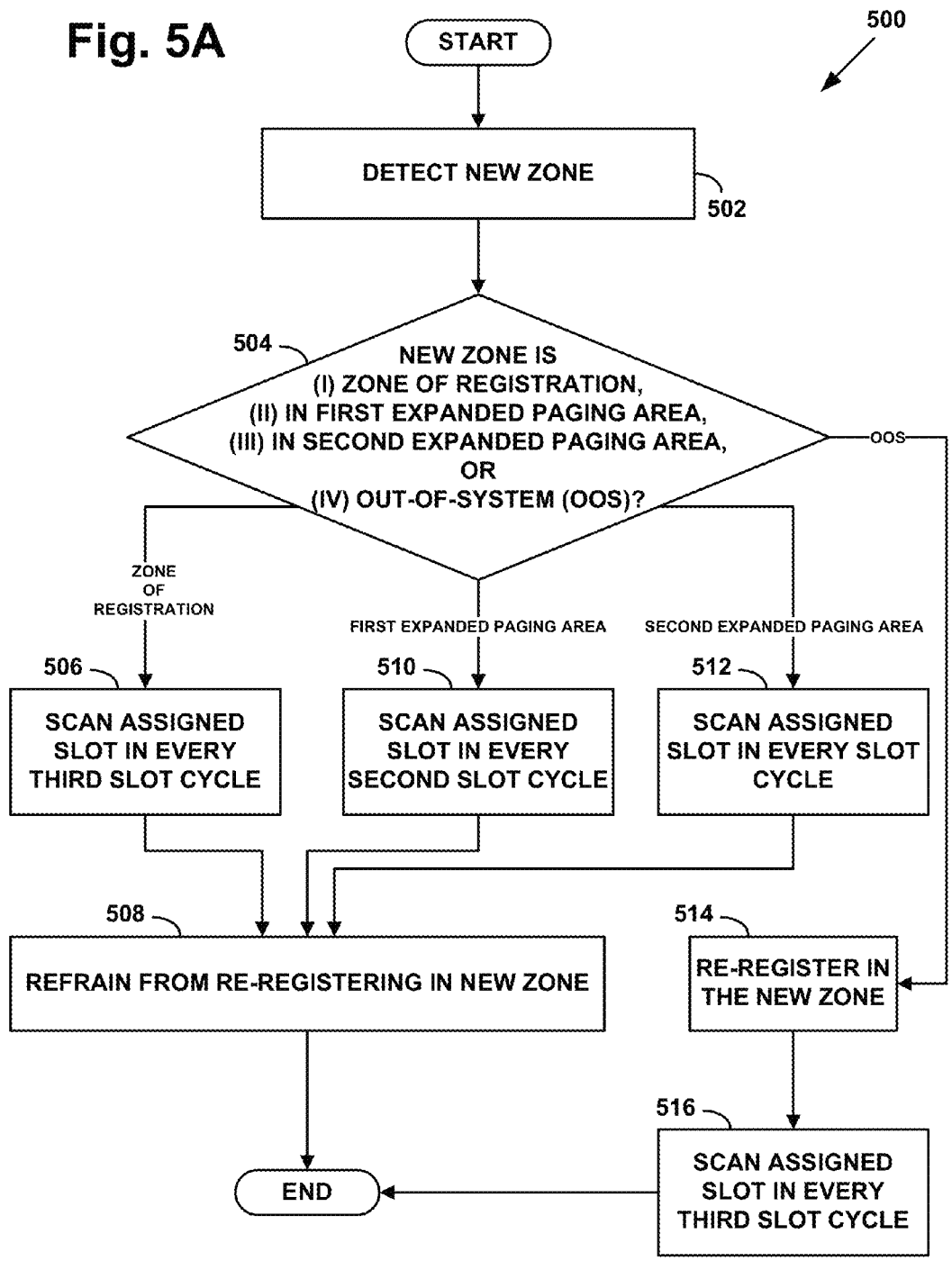

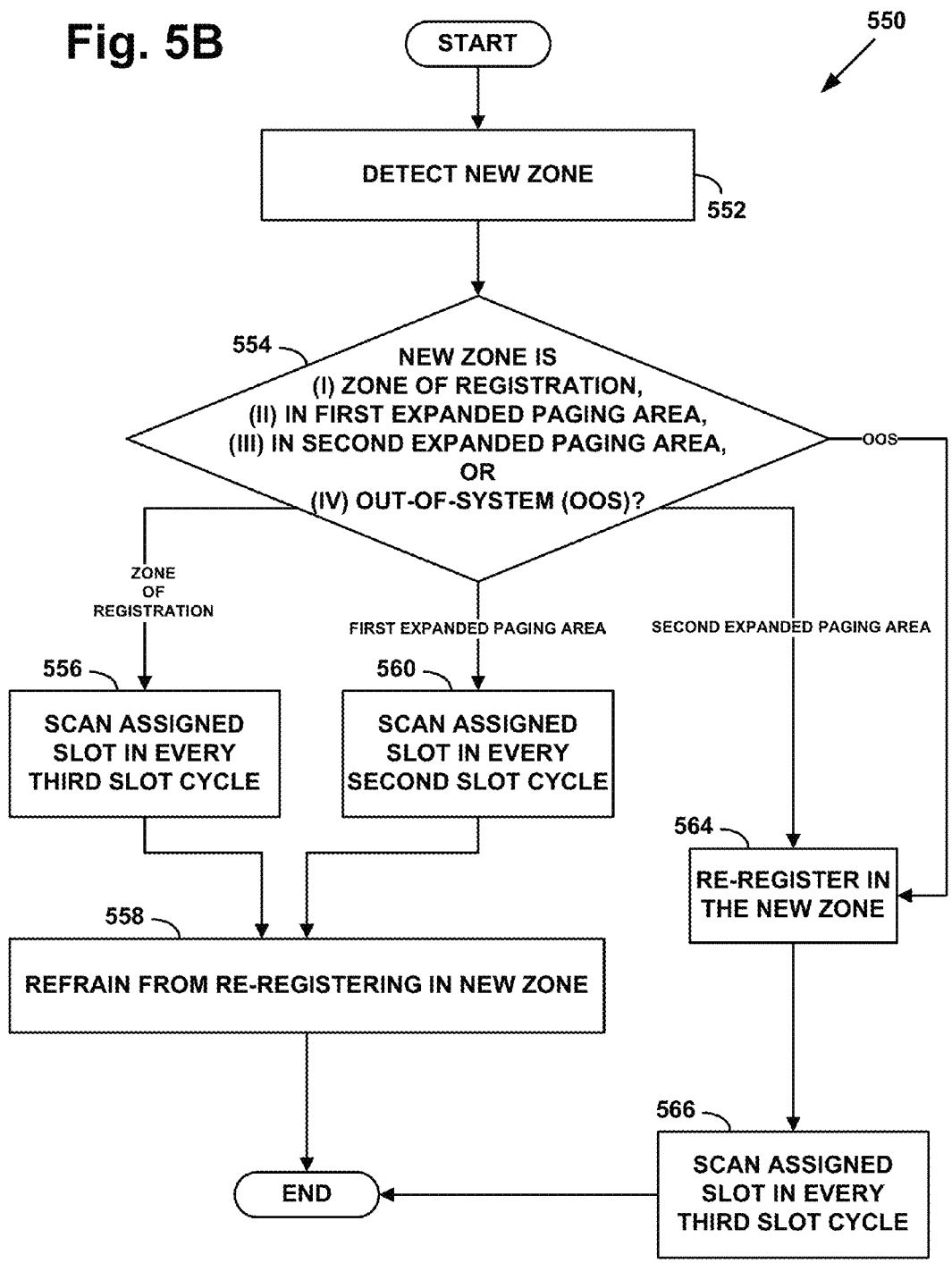

INTELLIGENT PAGING-CHANNEL SCANNING BASED ON LOCATION RELATIVE TO ZONE OF LAST REGISTRATION

BACKGROUND

In a typical cellular wireless communication system, an area is divided geographically into a number of cells and cell sectors, each defined by a radio frequency (RF) radiation pattern from a respective base station antenna. The base station antennae in the cells may then be coupled with a base station controller, which may then be coupled with a switch or gateway that provides connectivity with a transport network such as the public switched telephone network (PSTN) or the Internet. When a mobile station, such as a cellular telephone, pager, or wirelessly-equipped computer, is positioned in a cell, the mobile station communicates via an RF air interface with the base station antennae of a cell. Consequently, a communication path can be established between the mobile station and the transport network, via the air interface, the base station, the base station controller, and the switch or gateway.

Further, in some wireless communication systems, multiple base stations are connected with a common base station controller, and multiple base stations are connected with a common switch or gateway. Each base station controller may then manage air interface resources for multiple wireless coverage areas (e.g., multiple cells and sectors), by performing functions such as assigning air interface traffic channels for use by mobile stations in the coverage areas and orchestrating handoff of calls between coverage areas. In turn, a switch and/or gateway may control one or more base station controllers and generally control wireless communications, by performing functions such as receiving and processing call requests, instructing base station controllers when to assign traffic channels, paging mobile stations, and managing handoff of calls between base station controllers.

In general, air interface communications in each sector (or other such coverage area) of a cellular wireless communication system can be encoded or carried in a manner that distinguishes the communications in that sector from communications in adjacent sectors. For example, in a Code Division Multiple Access (CDMA) system, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

Each sector may define an air interface "paging channel" on which the serving base station can page a mobile station. For example, paging channel may be used to send access probe acknowledgements and traffic channel assignment messages to served mobile stations. The paging channel also defines timeslots in which the base station can send various messages to particular mobile stations. For instance, if an access probe is received from one mobile station seeking to connect to a second mobile station, the base station may send a page via the paging channel to notify the second mobile station of the incoming call.

When a cellular wireless communication system seeks to page a mobile station (e.g., for an incoming call or for some other reason), a switch in the network may send the page message to numerous base stations in the switch's coverage area, with the hope that when the base stations broadcast the page message, the mobile station will receive the page message in one of the associated sectors, and will respond. Furthermore, given the scarcity of paging channel resources, however, many modern cellular networks are arranged to engage in a more targeted paging process known as "zone based paging."

With zone based paging, a cellular network is divided into paging zones, each with a respective zone ID, and paging is performed on a zone-basis. To facilitate this, each base station in the system may broadcast as one of its overhead parameters the zone ID for the zone in which the base station is located. Mobile stations operating in the network may then programmatically monitor the zone IDs indicated in the overhead messages and may automatically register with the network when they detect that they have moved into a new zone, or for other reasons. With this process, the registration records thereby maintained by switches and/or home location registers will indicate the paging zone in which each mobile station last registered.

Using the general paging strategy that is implemented in many wireless access networks, the network may make up to three attempts to page a mobile station. In particular, the network may first attempt to transmit a page record in the paging zone in which the mobile station is registered (i.e., the base stations in the paging zone in which the mobile station is registered transmit the page record). Then, if the first attempt is unsuccessful (i.e., the mobile station does not acknowledge the page record), the network makes a second attempt to page the mobile station by again transmitting the page record in the paging zone in which the mobile station is registered, and possibly in adjacent zones as well. If the second attempt also fails, then the network makes a third attempt to page the mobile station, which typically involves a system-wide transmission of the page record (i.e., in all paging zones served by the switch that serves the zone in which the mobile station last registered), although it is possible that a third attempt may be of a different scope as well.

OVERVIEW

Under the IS-2000 protocol, a time division multiple access (TDMA) scheme is used for the paging channel, which is accordingly divided into paging-channel slots (which may also be referred to as "timeslots"). In particular, the paging slot cycle may include a predetermined number of 80 millisecond (ms) slots. In IS-2000 systems, the paging slot cycle may be set in multiples of 1.28 seconds (or 16 slots), and is commonly set to 5.12 seconds (or 64 slots), according to a system parameter referred to as the slot cycle index (SCI).

Each mobile station will typically be assigned a particular slot in the slot cycle during which the mobile station will wake up and check the paging channel for a page. A serving system may then schedule pages to a given mobile station during its assigned slot in the slot cycle. Accordingly, to help conserve battery power, existing mobile stations typically monitor only their assigned slots on a given paging channel. For example, when the slot cycle is 5.12 seconds, mobile station will scan the paging channel every 5.12 seconds for any pages directed to the mobile station.

According to an exemplary embodiment, a mobile station may intelligently determine when it can scan the paging channel less frequently. In particular, a mobile station may determine its location relative to its zone of last registration, and adjust the amount of time it waits between paging-channel scans based on how far it is from the zone in which it last registered. For instance, if a mobile is still located in the zone in which it registered, then the mobile station may assume that up to three attempts will be made to send it a page at its current location, and thus may only wake up to scan in its assigned slot in every third slot cycle. However, if a mobile station is located in a neighbor zone, then the mobile station may assume that a page will only be sent to it on the second and third attempt, and thus may wake up to scan in its assigned slot in every second slot cycle. And if a mobile station is not located in its zone of last registration or a neighbor zone, then the mobile station may assume that a page will only be sent to it on the third attempt, and thus will wake up to scan in its assigned slot in every slot cycle.

In one aspect, an exemplary method involves a mobile station that is operating in a radio access network: (a) determining a location of the mobile station in relation to a zone of last registration, wherein the mobile station last registered with the radio access network in the zone of last registration; (b) using the location of the mobile station in relation to the zone of last registration as a basis for determining a scan period to wait between scans of a paging channel for a page from the radio access network; and (c) periodically scanning the paging channel according to the determined scan period.

Further, when a mobile station's battery power is running low, a mobile station may switch to a power-save mode in which the mobile station operates with reduced functionality in order to conserve its remaining battery power. Accordingly, an exemplary method may be implemented when a mobile station is operating in a power mode. For example, the method may further involve the mobile station making an initial determination to switch to operating in a power-save mode. Then, in response to the determination to switch to operating in the power-save mode, the mobile station may carry out steps (a)-(b) in order to determining the scan period. Further, once the mobile station switches to the power-save mode the mobile station may carry out (c) in order to scan the paging channel according to the determined scan period.

An exemplary method may be carried out by a mobile station operating in a radio access network that is configured to: (a) initially page the mobile station in the zone of last registration, (b) then if unsuccessful, page the mobile station in both the zone of last registration and a first expanded paging area, and (c) then if again unsuccessful, page the mobile station in the zone of last registration, the first expanded paging area, and a second expanded paging area. Accordingly, the step of determining the location of the mobile station in relation to the zone of last registration may involve the mobile station determining whether the mobile station is located in either: (a) the zone of last registration, (b) the first expanded paging area, or (c) the second expanded paging area. Then, if the mobile station is located in the zone of last registration, the mobile station may scan the paging channel in the mobile station's assigned slot in every third paging-channel slot cycle. Further, if the mobile station is located in the first expanded paging area, then mobile station may scan the paging channel in the mobile station's assigned slot in every second paging-channel slot cycle. Yet further, if the mobile station is located in the second expanded paging area, then the mobile station may scan the paging channel in the mobile station's assigned slot in every paging-channel slot cycle.

In a further aspect, another exemplary method may involve: (a) a mobile station determining a battery-power level of the mobile station, wherein the mobile station has most-recently registered with a radio access network in a zone of last registration; (b) the mobile station determining whether the determined battery-power level is below a threshold level; (c) if the determined battery-power level is above the threshold level, then the mobile station selecting a first scanning process; (d) if the determined battery-power level is below the threshold level, then the mobile station selecting a second scanning process, wherein the second scanning process varies a period between scans of a paging channel based at least in part on a location of the mobile station in relation to the zone of last registration; and (e) scanning the paging channel according to the selected scanning process.

And in yet a further aspect, an exemplary mobile-station system may include (i) a non-transitory tangible computer-readable medium; and (ii) program instructions stored on the non-transitory tangible computer-readable medium and executable by at least one processor to: (a) determine a location of the mobile station in relation to a zone of last registration, wherein the mobile station last registered with the radio access network in the zone of last registration; (b) use the location of the mobile station in relation to the zone of last registration as a basis to determine a scan period to wait between scans of a paging channel for a page from the radio access network; and (c) cause the mobile station to periodically scan the paging channel according to the determined scan period.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 5A is a flow chart illustrating a method for registration and scanning while in a power-save mode, according to an exemplary embodiment;

FIG. 5B is a flow chart illustrating another method for registration and scanning while in a power-save mode, according to an exemplary embodiment.

DETAILED DESCRIPTION

Figure 1:
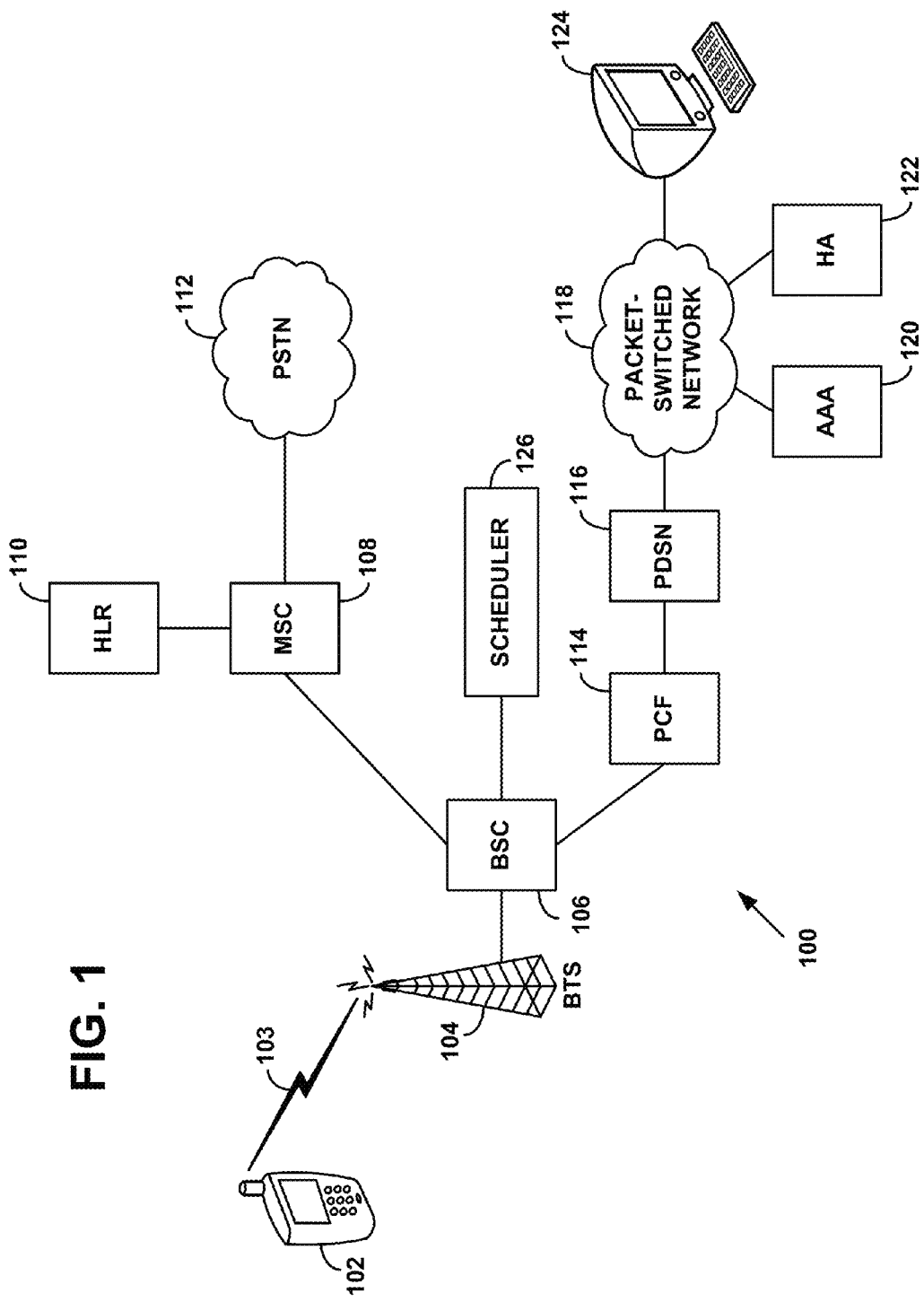
FIG. 1 shows a simplified block diagram of a wireless communication system in which an exemplary embodiment may be employed.

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

The present invention will be described by way of example with reference to Code Division Multiple Access ("CDMA") communications in general, and to IS-2000 communications in particular. As described below, IS-2000 applies to both circuit-cellular and packet-data communications. Under IS-2000, packet-data communications are referred to as "1X-

RTT" communications, also abbreviated as just "1X." However, since IS-2000 supports both circuit voice and packet data communications, the term 1X (or 1X-RTT) is sometimes used to more generally refer to the IS-2000 air interface, without regard to the particular type of communication carried. It should be understood that the present invention may apply to other wireless voice and data protocols including, without limitation, IS-95, GSM, IS-856 (EVDO), which, together with IS-2000 are considered herein, individually or in any combination, to comprise a CDMA family of protocols.

According to an exemplary embodiment, a mobile station determines how often to scan the paging channel based on the mobile station's location relative to the zone in which the mobile station last registered with the radio access network (RAN). When the mobile station is operating in a RAN that implements a zone-based paging scheme and possibly in other situations as well, the mobile station may intelligently adjust the period between paging-channel scans in an effort to conserve battery power. It should be understood, however, that an exemplary embodiment may provide other benefits in addition or in the alternative to power saving, and accordingly may be implemented in other scenarios and for other reasons, without departing from the scope of the invention.

Generally, the RAN is configured to page a mobile station less frequently in locations that are further from where the mobile station last registered with the RAN. Accordingly, when the mobile station is closer to its zone of registration, the mobile station will typically determine that it can scan the paging channel less frequently and conserve its battery power, and vice versa. For example, under an exemplary zone-based paging scheme, a page may be sent in the zone in which a mobile station last registered on the first, second, and third attempt to send a page (if a second and/or a third paging attempt is necessary). Accordingly, if a mobile station is located in its zone of last registration, the mobile station may determine that it only needs to wake up once every three paging channel slot cycles in order to receive a page. On the other hand, if the mobile station is in a zone other than its zone of last registration, then the mobile station may scan once every other slot cycle or even once in every slot cycle, depending upon how far the mobile station is from its zone of last registration. Other examples are also possible.

I. Exemplary Network Architecture

FIG. 1 shows a simplified block diagram of a wireless communication system 100 in which an exemplary embodiment may be employed. The communication system 100 is configured to provide wireless service to a mobile station 102, and includes a base transceiver station (BTS) 104, a base station controller (BSC) 106, and a mobile switching center (MSC) 108. Collectively, BTS 104, BSC 106, MSC 108 may be referred to as a RAN. Such a RAN may be operated by a service provider, and may also include additional BTSs, BSCs, and/or MSCs 108, and possibly other entities as well. As shown, mobile station 102 communicates over an air interface 103 with a BTS 104, which is then coupled or integrated with a BSC 106. Transmissions over air interface 103 from BTS 104 to mobile station 102 represent the forward link to the mobile station, while transmissions over interface 103 from mobile station 102 to BTS 104 represent the reverse link.

BSC 106 is in turn connected to MSC 108, which acts to control assignment of air traffic channels (e.g., over air interface 103), and provides access to wireless circuit-switched services such as circuit-voice and circuit-data (e.g., modem-based packet data) service. As represented by its connection to a public switched telephone network (PSTN) 112, MSC 108 is also coupled with one or more other MSCs or other telephony circuit switches in the operator's (or in a different operator's) network, thereby supporting user mobility across MSC regions, and local and long-distance landline telephone services. Also connected to MSC 108 is home location register (HLR) 110, which supports mobility-related aspects of subscriber services, including dynamic tracking of subscriber registration location and verification of service privileges.

As shown, BSC 106 is also connected to a packet data serving node (PDSN) 116 by way of packet control function (PCF) 114. PDSN 116 in turn provides connectivity with a packet-switched network 118, such as the Internet and/or a wireless carrier's private core packet-network. Sitting as nodes on network 118 are, by way of example, an authentication, authorization, and accounting (AAA) server 120, a mobile-IP home agent (HA) 122, and a remote computer 124.

With the arrangement described above, a mobile station 102 can engage in cellular voice and/or packet-data (e.g., 1X-RTT or EVDO) communications. Taking an originating call from mobile station 102 as an example, mobile station 102 first sends an origination request over air interface 103 and via the BTS 104 and BSC 106 to MSC 108. The MSC then signals back to the BSC directing the BSC to assign an air interface traffic channel for use by the mobile station. For a voice call, the MSC uses well-known circuit protocols to signal call setup and establish a circuit connection to a destination switch that can then connect the call to a called device (e.g., landline phone or another mobile station). For a packet-data session, the BSC signals to the PDSN 216 by way of PCF 214. The PDSN 216 and mobile station 102 then negotiate to establish a data link layer connection, such as a point to point protocol (PPP) session. Further, the PDSN 216 sends a foreign agent advertisement that includes a challenge value to the mobile station, and the mobile station 102 responds with a mobile-IP registration request (MIP RRQ), including a response to the challenge, which the PDSN forwards to HA 222. The HA then assigns an IP address for the mobile station 102 to use, and the PDSN passes that IP address via the BSC to the mobile station.

Generally, it should be understood that the depiction of just one of each network element in FIG. 1 is illustrative, and there could be more than one of any of them, as well as other types of elements not shown. The particular arrangement shown in FIG. 1 should not be viewed as limiting with respect to the present invention. Further, the network components that make up a wireless communication system such as system 100 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary mobile station 102 typically comprises a user-interface, I/O components, a communication interface, a tone detector, a processing unit, and data storage, all of which may be coupled together by a system bus or other mechanism.

Throughout this description, the term "base station" may be used to refer to a BTS, a BSC, or a combination of one or more BTSs and a BSC, for instance. Further, it should be understood that actions that are generally described as being carried out by the RAN (or simply by the "network") may be carried out by various different entities or combinations of entities in the RAN. Moreover, actions described as being carried out by one RAN entity may also be carried out by other RAN entities, in whole or in part, without departing from the scope of the invention.

II. General Paging Functionality

Each BTS in a RAN, such as BTS 104, preferably broadcasts a specification of paging channels defined in the BTS's respective coverage area. As such, a mobile station beginning to operate in a given sector can determine how many paging channels the coverage area includes and, if more than one, can determine which paging channel to monitor. By way of example, this specification may be an indication in an overhead message referred to as a system parameters message, which the base station broadcasts periodically or repeatedly. Further, the specification may define the paging channels expressly by particular coding parameters or, as noted above may simply indicate how many paging channels there are, which may inherently define the paging channels if a sequence of possible paging channels exists.

A mobile station that has no active data session or voice call (i.e., no assigned traffic channel), but is otherwise operational, is said to be in an "idle" state or mode. While in the idle state, the mobile station periodically scans the air interface for communication from the wireless communication system. More specifically, the mobile station monitors the paging channel for page messages from its serving base station and/or other base stations. Page messages are used to send the mobile station information, alerts, and requests during times when the mobile station isn't engaged in a communication (i.e., when the mobile station is idle). For instance, the mobile station may be alerted of an incoming call or other incoming communications via a page message.

Accordingly, a RAN may be configured to page a mobile station by transmitting a page message over a paging channel. Paging is typically initiated when an MSC receives an indication that a mobile station should be paged (e.g., an incoming call), or when the MSC itself determines that a mobile station should be paged. The indication normally includes an identifier of the mobile station, such as a Network Access Identifier (NAI), a Mobile Directory Number (MDN), a Mobile Identification Number (MIN), an International Mobile Subscriber Identifier (IMSI), an electronic serial number (ESN), and a mobile equipment identifier (MEID). The MSC may then transmit some representation of the indication to the appropriate BTS or BTSs. In turn, the BTS may use the mobile-station identifier to generate a page record, which the BTS may then place in a general page message (GPM) for transmission to the mobile station.

Each page record may contain error detection bits, such as a checksum. Thus, once the mobile station receives such a GPM, the mobile station typically will validate the checksum. If the checksum indicates that there are no bit errors in the page record, the mobile station may reply with a page-response message (PRM) on the access channel. After receiving the PRM, the RAN may then assign the one or more traffic channels to the mobile station. However, if the checksum indicates that one or more bits in the page record are in error, the mobile station may discard the GPM.

In an exemplary embodiment, each base station (e.g., BTS 104 and/or BSC 106) may include a scheduler 126, which functions to schedule page records received from switches, such as MSC 108, as they are received. As such, the scheduler 126 may function to group page records into GPMs, and schedule the transmission of the GPMs during appropriate paging-channel slots. While the scheduler 126 is shown as being connected to BSC 106, it should be understood that a scheduler may also be connected directly to a BTS 104. It should also be understood that while scheduler 126 is depicted as a separate entity from BTS 104 and BSC 106, a scheduler may be integrated as hardware, software, and or firmware in a BSC or in a BTS. Furthermore, it is possible that a scheduler may be implemented in another configuration altogether (such as a system-wide scheduler, for instance).

A RAN providing service under IS-2000 typically implements multiple paging channels (in practice, up to seven are usually provided), with each paging channel being subdivided into 2,048 periodically recurring, 80-millisecond (ms) slots. Under IS-2000, a recurring "slot cycle" that includes a predetermined number of timeslots is defined within a 2,048-slot "maximum slot cycle" period (e.g., 163.84 seconds). Herein, a slot cycle may also be referred to as a "paging-channel slot cycle." The slot cycle is set according to a system parameter called the slot cycle index (SCI). For instance, slot cycle index values of 0, 1, and 2 define slot cycles of 1.28, 2.56, and 5.12 seconds, respectively (i.e., 16, 32, and 64 slots, respectively) per maximum slot cycle. In existing IS-2000 networks, an SCI of 2 is typically used, and therefore each paging slot cycle is 5.12 seconds, or 64 slots, in duration. However, it is contemplated that exemplary embodiments may be implemented in conjunction with any maximum slot cycle period, any SCI, and possibly entirely different paging schemes as well.

In this context, each mobile station 102 is typically assigned a certain slot within the paging slot cycle by an appropriate scheduler 126. For instance, when a mobile station connects to a given base station under IS-2000, the mobile station is typically assigned to a certain slot in the slot cycle based on the mobile station's International Mobile Station Identifier (IMSI). Further, the RAN may implement a "hashing function" that effectively randomizes the selection of slots such that, on average, no one slot in the slot cycle is assigned to substantially more mobile stations than any other slot. Other techniques for assigning slots to mobile stations may be used as well.

Accordingly, to help conserve battery power, a mobile station 102 typically monitors only its assigned slot on a given paging channel. In practice, the duration of the scan is typically 80-120 ms, although longer or shorter scans are possible depending on the structure of the paging channel, whether a message has been sent, the length of the message, and the RF conditions on the mobile station's forward link, among other factors.

Furthermore, an exemplary mobile station 102 may or may not monitor its assigned slot in every slot cycle, depending upon the mobile station's location relative to where the mobile station registered. For example, when mobile station 102 is located near to where it last registered with the RAN, the mobile station may only scan its assigned slot only in every other slot cycle, but when further from where it last registered, scan in its assigned slot in every slot cycle. For instance, when the slot cycle is 5.12 seconds and mobile station 102 is located near to where it last registered, the mobile station may scan the paging channel every 10.24 seconds for any pages directed to the mobile station. When the mobile station is further from where it last registered, however, the mobile station may scan the paging channel every 5.12 seconds.

III. Resending Pages and Zone-Based Paging

In a further aspect of paging, a RAN will typically resend a page (and possibly do so a number of times) when a page fails to reach (or seemingly fails to reach) a mobile station. More specifically, when a mobile station receives a page, it typically responds to the RAN with a page response message. Therefore, if the RAN does not receive the page response, the RAN deduces that a failure of some sort occurred in paging the mobile station. The failure could result from the mobile station being temporarily out of coverage or for some other reason. When this occurs, the switch in the serving system (e.g., MSC 108) preferably attempts to re-page the mobile station. In particular, an MSC 108 may wait a predetermined period of time (five seconds, for instance) to receive an indication from a base station, which indicates a page response message has been received. If the MSC 108 does not receive such an indication, the MSC will resend the page to the base station to be transmitted to the mobile station. The MSC will repeat this process until a page response message indicates that the page was successfully received, or the maximum number of attempts has been made without receiving a page response message, and the page is deemed to have failed.

Furthermore, when a RAN seeks to page a mobile station 102 (e.g., for an incoming call or for some other reason), a switch, such as MSC 108, may send a page to numerous base stations in the switch's coverage area, such as BTS 104, with the hope that when the base stations broadcast the page message, the mobile station 102 will receive the page message in at least one of the associated sectors, and will respond. Given the scarcity of paging channel resources in most modern cellular networks, paging across multiple sectors is typically implemented with a more-targeted paging process that is commonly referred to as "zone-based paging."

With zone-based paging, a cellular network is divided into paging zones, each with a respective zone ID, and paging is performed on a zone-basis. To facilitate this, each base station (e.g., BTS 104) in the system may broadcast as one of its overhead parameters the zone ID for the zone in which the base station is located. A mobile station 102 operating in the network may then programmatically monitor the zone IDs indicated in the overhead messages and may register with the network when they detect that they have moved into a new zone, or for other reasons.

With this process, the registration records thereby maintained by switches and/or home location registers will indicate the paging zone in which each mobile station last registered. When a switch (e.g., MSC 108) seeks to page a mobile station, the switch may then efficiently send the page message to just those base stations that are within the zone of the mobile station's last registration, as it is likely that the mobile station is in that zone. Further, the switch may send the page message to the base stations in zones adjacent to the mobile station's zone of last registration, to cover the possibility that the mobile station has moved to a new zone but has not yet registered its presence in the new zone.

Using the general paging strategy that is implemented in many RANs providing IS-2000 and/or EVDO service, the network makes up to three attempts to page a mobile station. In particular, the MSC 108 may initiate a first attempt by sending a page record to one or more base stations for transmission in the paging zone in which the mobile station is registered (i.e., the base stations in the paging zone in which the mobile station is registered transmit the page record). Then, if the first attempt is unsuccessful (i.e., the mobile station does not acknowledge the page record), the MSC initiates a second attempt by again sending the page record to the one or more base stations for transmission in the paging zone in which the mobile station is registered, and possibly one or more additional base stations for transmission in one or more adjacent zones as well. If the second attempt also fails, then the MSC initiates a third attempt to page the mobile station, which typically involves sending the page record to multiple base stations for a system-wide transmission of the page record (i.e., in all paging zones), although it is possible that a third attempt may be of a different scope as well.

Figure 2:
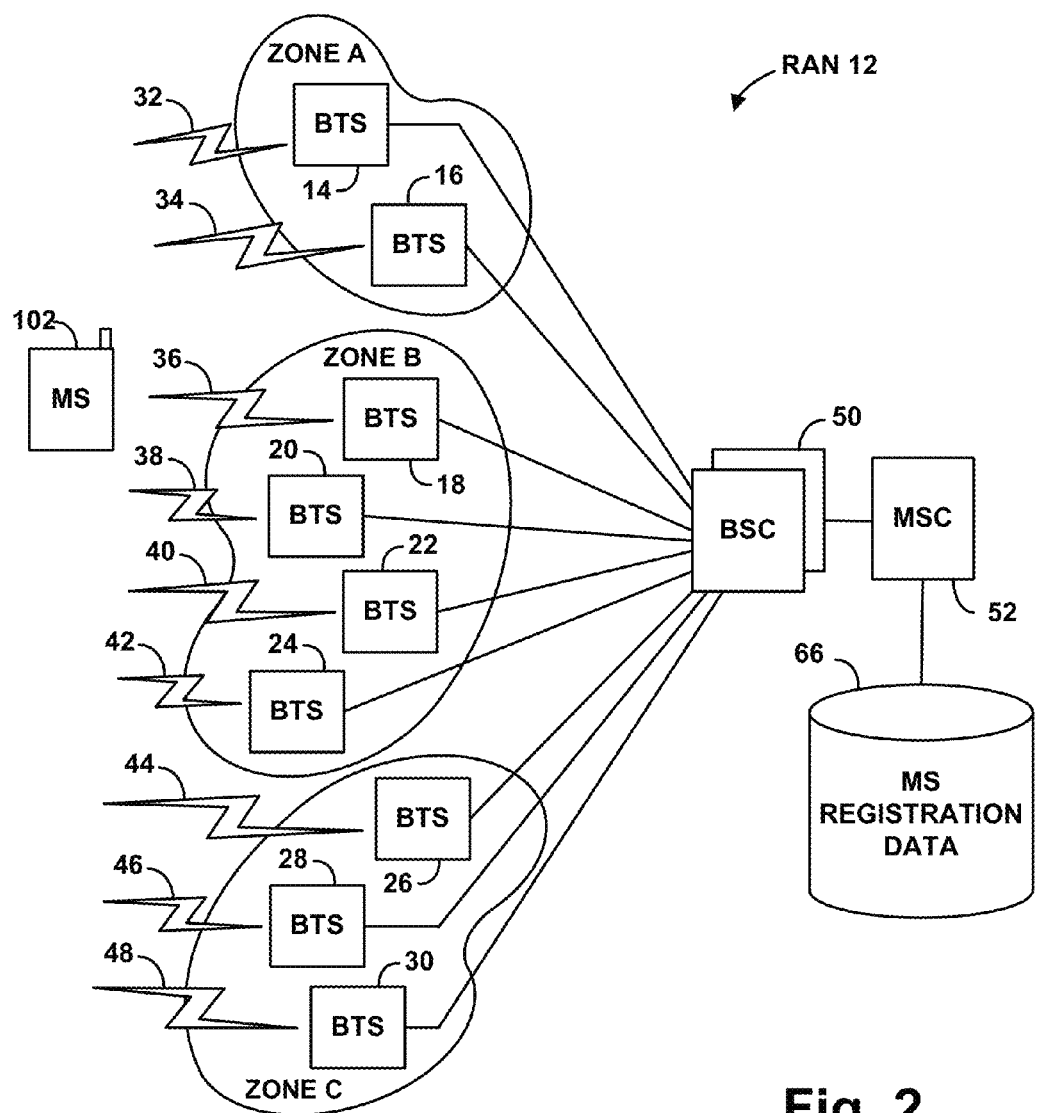
FIG. 2 is a block diagram illustrating a portion of a coverage area of radio access network in which an exemplary embodiment may be employed.

FIG. 2 is a block diagram illustrating a portion of a coverage area of radio access network 12, which is divided into paging zones according to a zone-based paging scheme. As shown, the base stations 14-30 are grouped into zones A, B, and C to facilitate zone-based paging as described above. In particular, each base station may broadcast a zone ID indicating its zone, and a mobile station such as mobile station 102 may monitor the zone IDs broadcast in the coverage areas where the mobile station is operating. When the mobile station detects a change in zone ID, the mobile station may then responsively register its presence in the new zone, so that the RAN would then know to page the mobile station in that new zone.

In an exemplary embodiment, zones are defined by MSCs (i.e., zone IDs are created, base stations are assigned to a particular zone ID, etc.). For instance, MSC 52 may create zone IDs corresponding to each zone A-C, and assign base stations 14-16 to zone A, base stations 18-24 to zone B, and base stations 26-30 to zone C. It should be understood, however, that other network entities may define paging zones, in combination with or instead of MSC 52, without departing from the scope of the invention.

As shown, MSC 52 also includes or has access to mobile station registration data 66. The mobile station registration data 66 preferably comprises data that specifies per mobile station where the mobile station is currently registered, such as the zone in which the mobile station is currently registered, among possibly other information. More specifically, the mobile station registration data may take the form of a visitor location register (VLR) database, which holds a record per mobile station in the MSC's service area. The mobile station's current zone of registration can thus be indicated in the mobile station's VLR record. Alternatively or additionally, the mobile station registration data can take the form of a home location register (HLR) database that is accessible via the MSC 52. Still alternatively, the data may be stored internally at the MSC and/or base stations, or elsewhere in some other form.

Generally, it should be understood that paging schemes other than zone-based paging may be employed, without departing from the scope of the invention. For instance, a base station may be paged only in the sector in which it is registered, or only in the zone in which it is registered. As such, it is also possible that a base station may the track the paging-attempt status, since such embodiments may not involve coordination between multiple base stations that send a given page under a zone-based paging scheme. As an example of another alternative embodiment, it is even possible that an exemplary embodiment may be implemented in a system in which no re-paging is performed—in this case, each page may simply be treated as the last attempt to send a given page.

IV. Exemplary Methods and Systems

Figure 3:
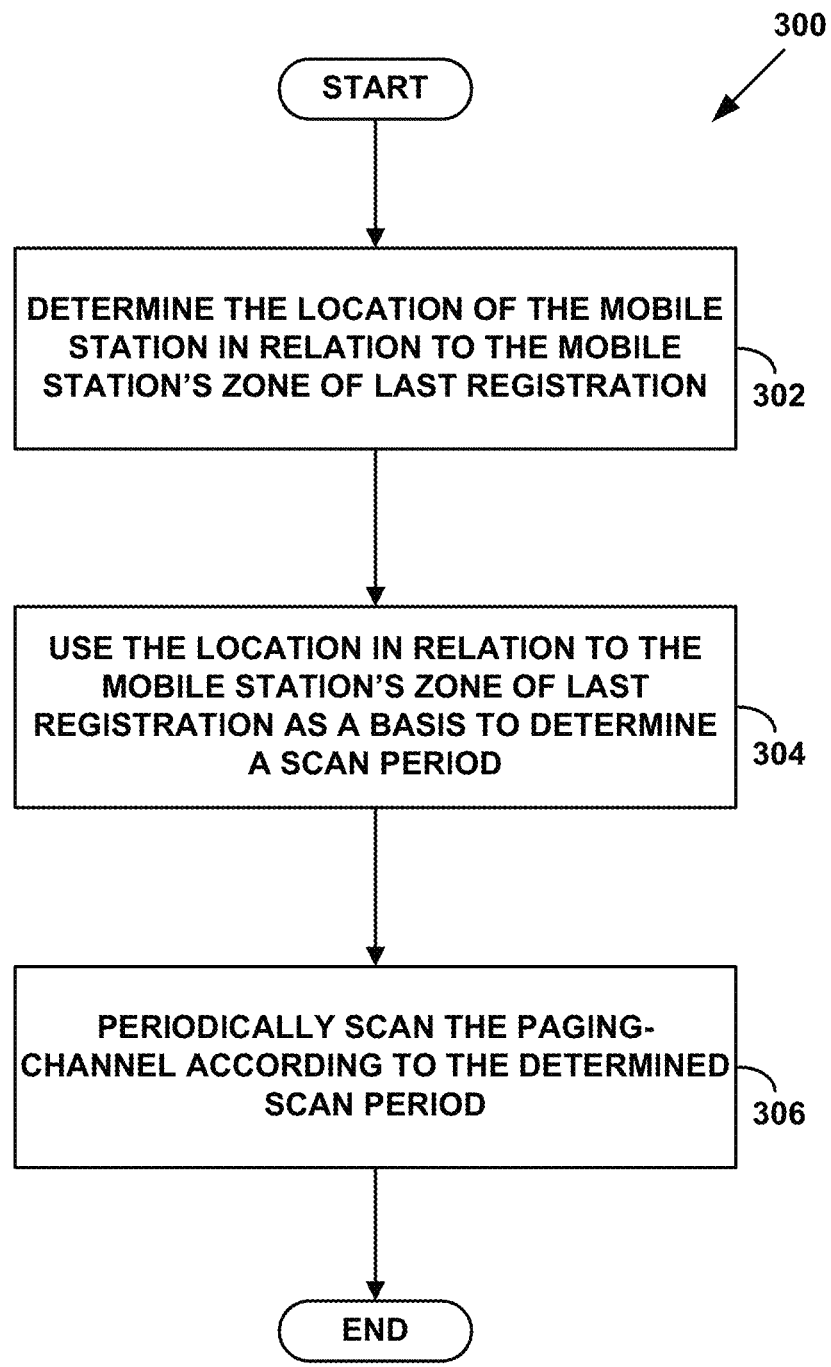
FIG. 3 is a flow chart illustrating a method, according to an exemplary embodiment.

FIG. 3 is a flow chart illustrating a method 300 according to an exemplary embodiment. Method 300 involves a mobile station determining the location of the mobile station in relation to a zone of last registration, as shown by block 302. The mobile station then uses its location in relation to its zone of last registration as a basis for determining a scan period, as shown by block 304. According to an exemplary embodiment, the "scan period" indicates the duration of time that the mobile station should wait between consecutive paging-channel scans. The mobile station then proceeds to periodically scan the paging channel according to the determined scan period, as shown by block 306.

An exemplary method 300 may be implemented by a mobile station that is operating in a RAN in which a zone-based paging scheme is implemented. For example, the RAN may be configured to initially send a page to a mobile station in the mobile station's zone of last registration. Then if the initial attempt is unsuccessful, the RAN may make a second attempt to send the page in both the zone of last registration and a first expanded paging area (e.g., neighbor zones of the zone of last registration). And if the second attempt is unsuccessful, then the RAN may expand the third and final attempt to send the page to a second expanded paging area, as well as the zone of last registration and the first expanded paging area. In an exemplary embodiment, the third attempt may be a system-wide, and thus may be sent in all zones that are served by the same switch that serves the zone of last registration.

Therefore, the mobile station's location relative to the zone of last registration may be determined to be either: (a) in the zone of last registration, (b) in the first expanded paging area, or (c) in the second expanded paging area. In an embodiment where the RAN implements an exemplary zone-based paging scheme, the mobile station may consider itself to be located in the first expanded paging area when the mobile station determines that it is located in a neighbor zone of its zone of last registration. Further, the mobile station may consider itself to be located in the second expanded paging area when it determines that it is located in a zone which is served by the same switch as serves its zone of registration and is separated from its zone of last registration by at least one zone. Zones in the second expanded paging area may be referred to herein as "outer zones."

In an alternative embodiment, the mobile station's location relative to the zone of last registration may be determined to simply be either within the zone of last registration or outside the zone of last registration. The location in relation to the zone of last registration may be defined in other ways as well, without departing from the scope of the invention.

In practice, a mobile station may be provided with information regarding the location of a given zone relative to the mobile station's zone of last registration by the RAN. For example, when a mobile station registers in a given zone, the RAN may send the mobile station a zone-information message. The zone-information message may be created by the switch that serves the zone in which the mobile registers, and then sent by the switch to the mobile station's serving BTS for transmission to the mobile station.

Since the coverage area of a switch typically includes multiple zones, with each zone including one or more sectors, a zone-information message may provide an indication of the location of each sector in relation to the zone of registration. As one specific example, the zone-information message may indicate for each sector served by the switch, whether the sector is: (a) in the zone in which the mobile station just registered, (b) in the first expanded paging area for the mobile station (i.e., in a neighbor zone of the zone in which the mobile station just registered), or (c) in the second expanded paging area for the mobile station (i.e., in an outer zone relative to the zone in which the mobile station just registered). Provided with such a zone-information message, a mobile station may be able to determine its current location in relation to its zone of last registration by determining the sector in which it is currently located, and then determining the location of the sector in relation to its zone of last registration.

Based on its location relative to the zone of last registration, a mobile station may expect that the RAN will attempt to send a page more or less frequently. Accordingly, the mobile station may adjust its scan period to be longer or shorter depending upon whether it expects the RAN's attempts to resend a page to be more or less frequent, respectively. For example, under an exemplary zone-based paging scheme, if the mobile station is located in its zone of last registration, then the mobile station is in a location where all three paging attempts will be sent (if a second or third attempt is necessary). Accordingly, the mobile station knows that if it misses a page on the first attempt, or even on the first and the second attempt, it is still likely that the mobile station will receive the page on the third attempt. Therefore, if the mobile station determines that it is located in the zone of last registration, then the mobile station may determine the duration of the scan period to be three paging-channel slot cycles. With this scan period, the mobile station will scan the paging channel in the mobile station's assigned slot in every third paging-channel slot cycle.

Furthermore, if the mobile station is located in a neighbor zone, then the mobile station is in a location where it does not expect that a page will be sent to it on the initial attempt. However, because the mobile station is located in the neighbor zone, the mobile station expects that the page will be sent to it on the second attempt and/or on the third attempt (if a third attempt is necessary). Since the page should be sent to it in two out of three consecutive slot cycles, the mobile station should receive the page on at least the second attempt or third attempt, so long as the mobile station scans the paging channel in every other paging-channel slot cycle. Accordingly, if the mobile station determines that it is located in a neighbor zone, then the mobile station may determine the duration of the scan period to be two paging-channel slot cycles. With this scan period, the mobile station will scan the paging channel in the mobile station's assigned slot in every second paging-channel slot cycle.

Yet further, if the mobile station is located in an outer zone, which is separated from the zone of last registration by at least one zone, then the mobile station is in a location where it expects that a page will not be sent to it until the third attempt to send the page. Thus, the mobile station does not expect to be sent a page on the initial attempt or on the second attempt. Therefore, if the mobile station does not scan the paging channel in every paging-channel slot cycle, there is a significant possibility that the mobile station will miss a page altogether. Accordingly, if the mobile station determines that it is located in the second expanded paging area, then the mobile station may determine the duration of the scan period to be one paging-channel slot cycle.

The foregoing embodiment in which the mobile station adjusts its scan period between one and three slot cycles is most appropriate in a system where the RAN's attempts to send a page occur in consecutive slot cycles. However, due to the timing with which a switch initiates subsequent attempts to send a page, attempts may or may not be made in consecutive slot cycles. In particular, a base station's scheduling of a subsequent attempt to send a given page depends upon when the switch resends the page to the base station, and thus depends upon the period of time a switch will wait for a page response message before initiating the subsequent attempt. For example, in some IS-2000 networks, MSCs may be configured to wait five seconds between attempts. As such, by the time the MSC waits five seconds and then indicates to a base station to make a subsequent attempt to send the page, the mobile station's assigned slot in the next slot cycle (i.e., 5.12 seconds after the first attempt) may have passed, and as such, the next attempt may be scheduled for the mobile station's assigned slot, two slot cycles later (i.e., 10.24 seconds after the initial attempt).

When paging attempts are separated by two slot cycles, a mobile station may vary its scanning process accordingly. For instance, the mobile station may change the way in which it varies the scan period, and may scan in two consecutive slot cycles after each scan period. As a specific example, when the mobile station is located in its zone of last registration, the mobile station may set the scan period to be four slot cycles. Accordingly, the mobile may scan during its assigned slot in two consecutive slot cycles, and then wait for four slot cycles before again scanning in two consecutive slot cycles, and so on. Further, when the mobile station is located in the first expanded paging area, the mobile station may set the scan period to be two slot cycles, and thus alternate between scanning its assigned slot in two consecutive slot cycles and refraining from scanning in the next two slot cycles. It should be understood that a mobile station may vary its scan period and scanning process in other ways to account for other variations in the manner in which a RAN resends pages, without departing from the scope of the invention.

In a further aspect, an exemplary method may be initiated when a mobile station decides to switch to a power-save mode in order to conserve battery power. In particular, when the mobile station decides to switch to the power-save mode, the mobile station may determine its scan period as shown in block 304. Then, while operating in the power-save mode, the mobile station will scan according to the determined scan period, as shown in block 306. Thus, in order to save power, the mobile station preferably increases the scan period as much as possible. For example, the mobile station may determine if it can increase its scan period such that it will only scan in its assigned slot in every other or every third slot cycle, depending upon the mobile station's location relative to its zone of last registration.

Figure 4:
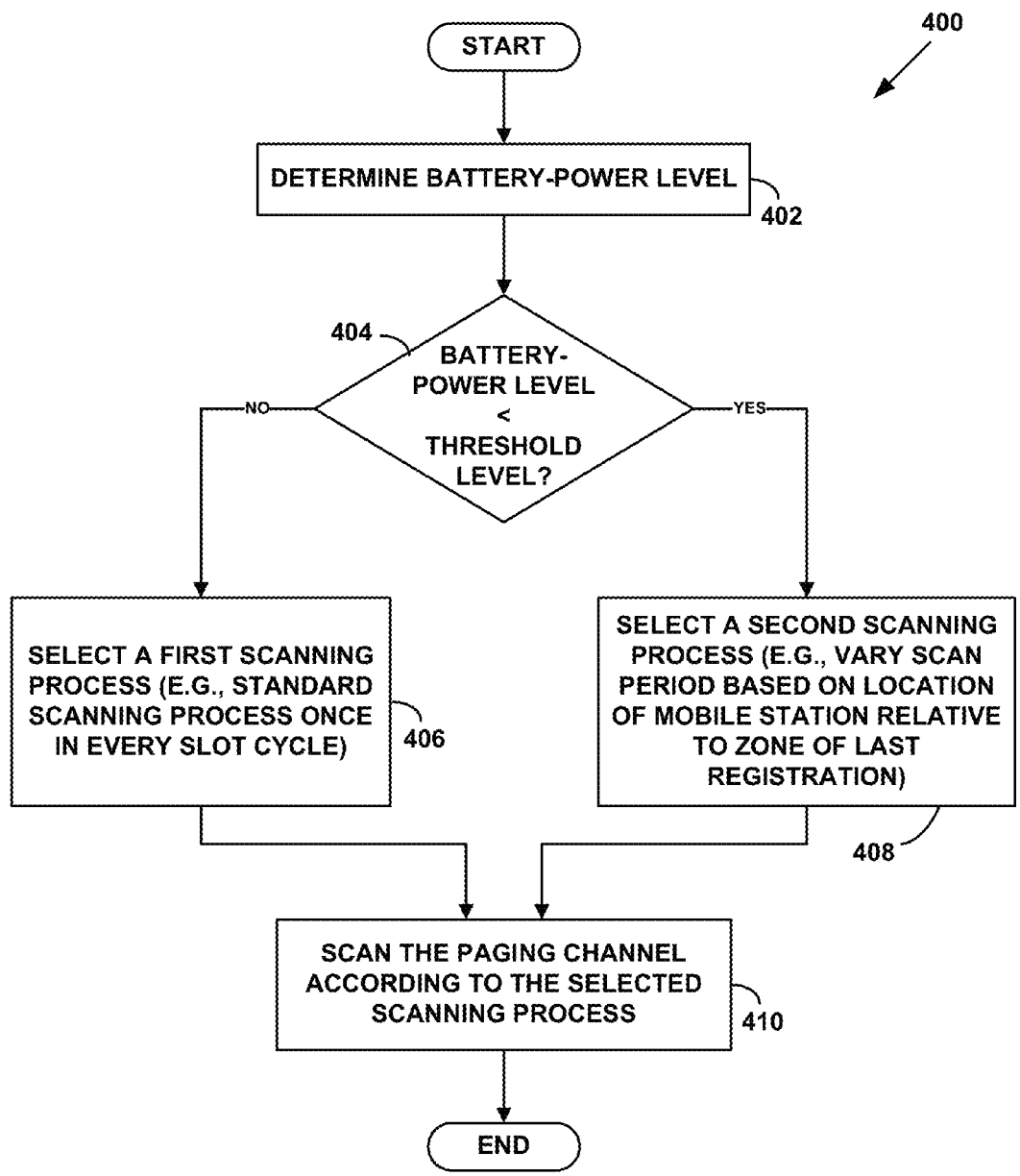
FIG. 4 is a flow chart illustrating another method, according to an exemplary embodiment.

A mobile station may determine that it should switch from a standard operating mode to a power-save mode for any number of reasons. For example, a mobile station may switch to the power-save mode and adjust its scan period accordingly whenever the mobile station detects that its remaining battery power has fallen below a threshold power level. FIG. 4 is a flow chart illustrating an exemplary method 400 that may be implemented by a mobile station to adjust its scanning process in an effort to conserve its battery power.

More specifically, method 400 involves a mobile station determining its battery-power level, as shown by block 402. The mobile station then determines whether or not its battery-power level is below a threshold level, as shown by block 404. If the mobile station's battery-power level is above the threshold level, then the mobile station selects a first scanning process, as shown by block 406. The first scanning process, which is selected when the mobile station's battery-power level is above the threshold level, is preferably the standard process where the mobile station scans in its assigned slot in every paging-channel slot cycle. If, on the other hand, the mobile station's battery-power level is below the threshold level, then the mobile station selects a second scanning process, as shown by block 408. As shown, the second scanning process preferably involves the mobile station varying its scan period based on the location of the mobile station in relation to the zone of last registration. (Note that it is a matter of engineering design choice as to whether the first or second scanning process is selected when the battery-power level is equal to the threshold level.) In either case, the mobile station then scans the paging channel according to the selected scanning process, as shown by block 410.

When the second scanning process is selected, the mobile station preferably reduces how often it scans when possible. For instance, a mobile station may scan less often by increasing its scan period. This may reduce the overall number of scans performed by the mobile station, which may in turn reduce the cumulative amount of power consumed to perform the scans. In an exemplary embodiment, whether or not the mobile station can increase its scan period, and if so by how much, is preferably a function of the location of the mobile station in relation to its zone of last registration. In particular, the scan period may be determined based upon the location of the mobile station in relation to its zone of last registration, as described in reference to FIG. 2 herein.

It should be understood that, in addition to an adjusted scan period, operation in the power-save mode may also involve a mobile station reducing or possibly even eliminating various other mobile-station functions that tend to consume battery power. As one example, a mobile station may register with a RAN less frequently when operating in the power-save mode. Other examples are also possible.

FIG. 5A is a flow chart illustrating an exemplary method 500 for registration and scanning while in a power-save mode. As shown by block 502, method 500 involves the mobile station detecting that it has moved to a new zone. The mobile station then determines whether the new zone is its zone of registration, a zone in the first expanded coverage area, an outer zone in the second expanded coverage area, or an out-of-system (OOS) zone, as shown by block 504.

If the mobile station detects that it is in its zone of last registration, then the mobile station only scans its assigned slot in every third slot cycle, as shown by block 506, and refrains from re-registering with the RAN, as shown by block 508. If the mobile station detects that it has traveled into a zone in the first expanded paging area, then the mobile station scans every second slot cycle, as shown by block 510. However, in an effort to conserve battery power by reducing the overall number of times a mobile station needs to register, the mobile station does not re-register in the first expanded paging area, as again shown by block 508. Further, while the mobile station may scan in every slot cycle when it detects that it has traveled into a zone in the second expanded paging area, as shown by block 512, the mobile station may still attempt to conserve battery power by refraining from re-registering with the RAN, as again shown by block 508.

Therefore, when a mobile station implements method 500, the mobile station will only re-register with the RAN when it moves from one serving system to another, and thus has entered an "out-of-system" zone. Herein, an out-of-system (OOS) zone may be any zone that is served by a different serving system from the serving system that serves a mobile station's zone of last registration. As shown, when the mobile station detects that it has traveled into an out-of-system zone, the mobile station re-registers with the RAN, as shown by block 514. Since the mobile station has re-registered in the out-of-system zone, this zone now becomes the mobile station's zone of last registration (and thus ceases to be considered an out-of-system zone for the mobile station). Accordingly, the mobile station will scan only in every third slot cycle, as shown by block 516.

FIG. 5B is a flow chart illustrating another exemplary method 550 for registration and scanning while in a power-save mode. A mobile station that implements method 550 may re-register more frequently than it would if it were using method 500. However, re-registering more frequently may result in a mobile station being located in its zone of last registration more frequently, which means a mobile station may be located in its zone of last registration more often.

Since a mobile station may scan less frequently when located in its zone of last registration, the reduction in power consumption from less-frequent scanning may offset the increase in power consumption from more-frequent re-registration. Furthermore, depending upon the movement of a given mobile station, the reduction in power consumption resulting from less-frequent scanning may partially or wholly offset, or even exceed, the increase from more-frequent re-registration. Therefore, it is possible that method 550 may or may not result in a greater overall reduction in power-consumption as compared to method 500, depending upon the manner in which a given mobile station moves about.

Turning to the specifics of method 550, the method involves a mobile station detecting that it has moved to a new zone, as shown by block 552. The mobile station then determines whether the new zone is its zone of registration, a zone in the first expanded coverage area, a zone in the second expanded coverage area, or an out-of-system (OOS) zone, as shown by block 554. The actions taken when a mobile station detects that it is in its zone of last registration, and when a mobile station detects that it is in the first expanded paging area of its serving system, are the same in method 550 as in method 500, as shown by blocks 556-560. Furthermore, actions taken when a mobile station detects that it is in an OOS zone are also the same in method 550 as in method 500, as shown by block 564-566.

However, according to method 550, when the mobile station detects that it has traveled into a zone in the second expanded paging area, the mobile station re-registers with the RAN, as again shown by block 564. Since the mobile station has re-registered in the zone in the second expanded paging area, this zone now becomes the mobile station's zone of last registration (and thus ceases to be considered part of the mobile station's second expanded paging area). Accordingly, the mobile station will scan only in every third slot cycle, as again shown by block 566. Therefore, even though the mobile station uses some additional power to re-register (as compared to method 500, where the mobile station refrains from re-registering in the second expanded paging area), the re-registration also allows the mobile station to reduce its power consumption by scanning the paging channel less frequently.

Figure 6:
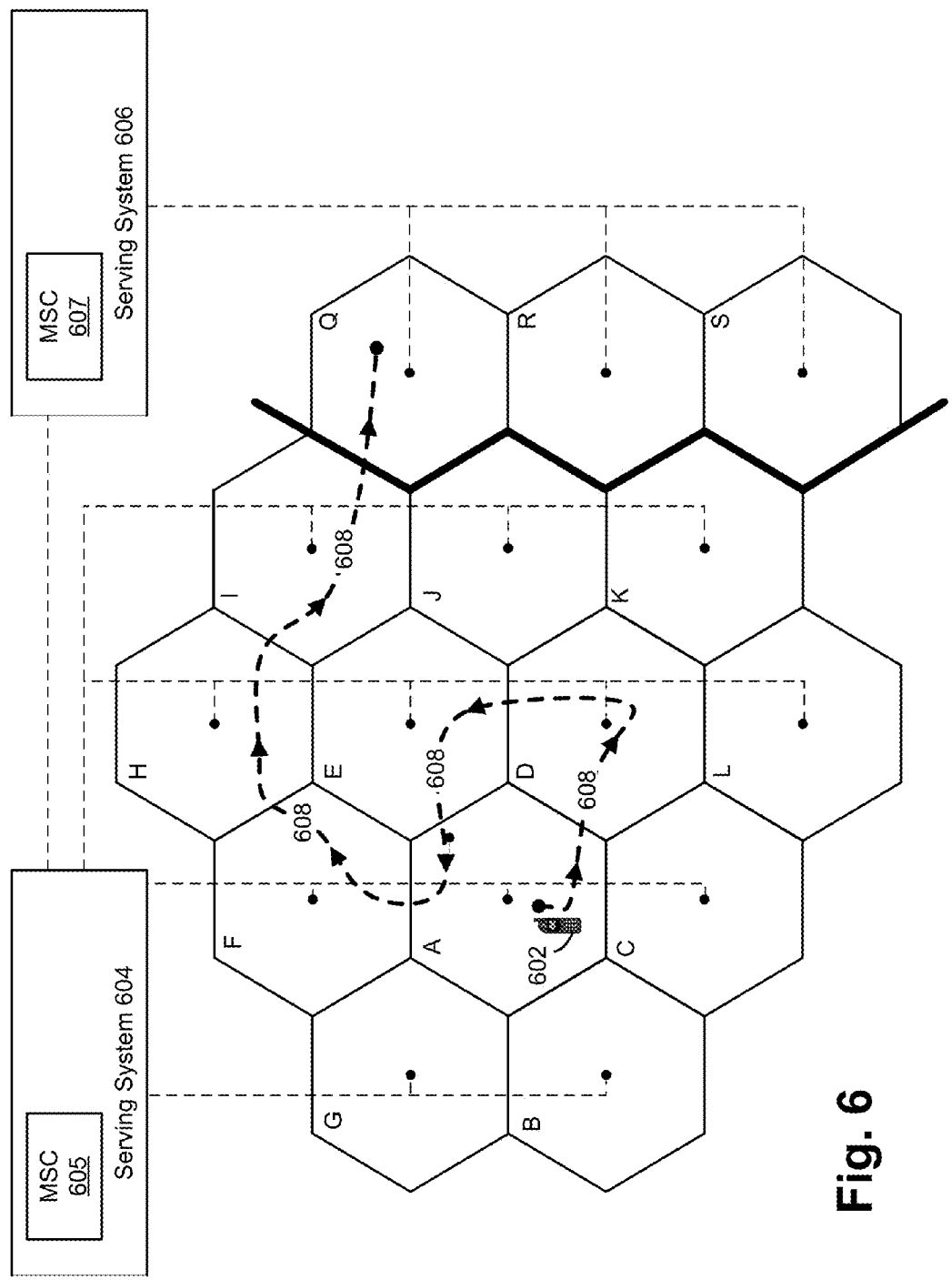
FIG. 6 is a block diagram illustrating movement of an exemplary mobile station through a coverage area of a radio access network.

FIG. 6 is a block diagram illustrating movement of an exemplary mobile station 602 through a coverage area of a RAN. As shown, the mobile station 602 is operating in a coverage area that includes a first serving system 604 and a second serving system 606. The first serving system 604 is configured to provide service in zones A-K, and the second serving system 606 is configured to provide service in zones Q-S. Herein, a "serving system" includes a switch and the other RAN entities that operate together with the switch to provide service in the coverage area of the switch. For example, serving system 604 includes an MSC 605 that is configured to provide service in a coverage area that includes zones A-K. Accordingly, serving system 604 may also include one or more BTSs (not shown) that each provide service in one or more sectors in the larger coverage area of MSC 605, and one or more BSCs (not shown) that control the BTSs in the serving system. Serving system 606 likewise includes an MSC 607, and may also include one or more BTSs and/or one or more BSCs in order to provide service in the coverage area that includes zones A-K.

In the illustrated scenario, mobile station 602 travels throughout the coverage area of the RAN along path 608. More specifically, the mobile station 602 is initially located in zone A, which is initially its zone of last registration, and then travels along path 608. Moving along path 608, mobile station 602 moves from zone A to zone D, then from zone D to zone E, then from zone E back to zone A, then from zone A to zone F, then from zone F to zone H, then from zone H to zone I, and finally from zone I to zone Q.

To illustrate an exemplary method in practice, consider a scenario where mobile station 602, while located in zone A, determines that its battery power is low and responsively switches to a power-save mode according to method 500 of FIG. 5A. In this scenario, since zone A is the mobile station's zone of last registration, mobile station 602 only scans the paging channel in every third slot cycle. When mobile station 602 moves from zone A to zone D, which is one of the mobile station's neighbor zones (i.e., a zone in the mobile station's first expanded paging area), the mobile station scans the paging channel in every second slot cycle. Further, because zone D is in the mobile station's first expanded paging area, the mobile station refrains from re-registering in zone D. Further, when mobile station 602 moves from zone D to zone E, which is another one of the mobile station's neighbor zones, mobile station 602 continues to scan in every second slot cycle and refrains from re-registering in zone E. Mobile station 602 then moves from zone E back to zone A, which is its zone of registration. Accordingly, mobile station reduces the frequency of its scans to once every three slot cycles, and continues to refrain from re-registering. After mobile station 602 moves along path 608 and back into zone A, mobile station 602 then moves into zone F, which is yet another one of the mobile station's neighbor zones. As such, mobile station will again switch to scanning every other slot cycle, and will continue to refrain from re-registering.

Moving further along path 608, mobile station 602 travels out of zone F and into zone H, which is in the mobile station's second expanded paging area (i.e., a zone that is served by the same serving system as serves the mobile station's zone of last registration, but is separated from the zone of last registration by at least one zone). Since zone H is in the mobile station's second expanded paging area, mobile station 602 will scan in its assigned slot in every slot cycle, so long as the mobile station remains in zone H. Further, according to method 500, mobile station 602 refrains from re-registering in zone H. Likewise, when mobile station 602 moves from zone H to zone I, which is also in the mobile station's second expanded paging area, the mobile station continues scanning the paging channel in every one of its assigned slots, and again refrains from re-registering.

Note that when mobile station 602 implements method 500, the mobile station will not re-register until it enters a zone that is not served by the first serving system 604. As a result, zone A remains the mobile station's zone of last registration while the mobile station 602 moves out of zone A, through zones D and E and back to zone A, then back out of zone A and through zones F and H into zone I. However, as the mobile station continues along path 608, the mobile station travels out of zone I and into zone Q, which is served by the second serving system 606. Therefore, mobile station 602 detects that it has traveled into an out-of-system zone. As a result, the mobile station will re-register in zone Q, which effectively makes zone Q its new zone of last registration. Thus, once mobile station 602 registers in zone Q, mobile station 602 may begin to scan the paging channel only once in every three slot cycles.

Further, when mobile station 602 registers in zone Q with the second serving system 606, the second serving system 606 may send updated zone information to mobile station 602. In particular, a zone-information message may identify sectors in zone Q as being in the zone of last registration, sectors in zone R as being in the first expanding paging area, and sectors in zone S as being in the second expanded paging area. The updated zone information may not include any information regarding zones A-K since these zones are not served by the second serving system 606. Therefore, the mobile station may assume from that the lack of any indication for any of zones A-K, that these zones are all OOS zones.

To illustrate another exemplary method in practice, consider a different scenario where mobile station 602, while located in zone A, determines that its battery power is low and responsively switches to a power-save mode according to method 550 of FIG. 5B. According to method 550, the mobile station operates in the same manner as it would under method 500, except that the mobile station will re-register when it enters a zone in its second expanded paging area.

As mobile station 602 moves along path 608 out of zone A, through zones D and E and back to zone A, and then back out of zone A into zone F, mobile station 602 is either in its zone of last registration (zone A) or a neighbor zone (zone D, E, or F). Therefore, as mobile station 602 moves along this portion of path 608, it refrains from re-registering and adjusts its scan period in the same manner as it would under method 500. However, when mobile station 602 travels out of zone F it moves along path 608 into zone H, which is in the mobile station's second expanded paging area. And since mobile station 602 is implementing method 550, mobile station 602 will re-register in zone H.

When mobile station 602 re-registers in zone H, this makes zone H the mobile station's zone of last registration. Thus, once mobile station 602 registers in zone H, mobile station 602 may begin to scan the paging channel only once in every three slot cycles. Furthermore, when mobile station 602 registers in zone H, the first serving system 604 may send updated zone information to mobile station 602. In particular, the updated zone-information message may identify sectors in zone H as being in the zone of last registration, sectors in zones E, F, and I as being in the first expanded paging area, and sectors in zones A-D, G-H, and J-K as being in the second expanded paging area. Accordingly, when mobile station 602 moves along path 608 out of zone H and into zone I, zone I will be a neighbor sector. Accordingly, mobile station 602 will scan every other slot cycle and refrain from re-registering in zone I.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
   (a) at a mobile station that is operating in a radio access network, determining a location of the mobile station in relation to a zone of last registration, wherein the mobile station last registered with the radio access network in the zone of last registration, wherein the zone of last registration is a paging zone in the radio access network, wherein determining the location of the mobile station in relation to a zone of last registration comprises:
      (i) determining a current paging zone in which the mobile station is currently located, wherein the current paging zone is a paging zone in the radio access network; and
      (ii) determining a location of the current paging zone in relation to the zone of last registration;
   (b) the mobile station using the location of the mobile station in relation to the zone of last registration as a basis for determining a scan period to wait between scans of a paging channel for a page from the radio access network; and
   (c) the mobile station periodically scanning the paging channel according to the determined scan period.

2. The method of claim 1, further comprising:
   the mobile station initially making a determination to switch to operating in a power-save mode; and
   in response to the determination to switch to operating in the power-save mode, the mobile station carrying out (a)-(b), switching to the power-save mode, and carrying out (c) while in the power-save mode.

3. The method of claim 2, wherein making the determination to switch to operating in the power-save mode comprises making a determination that a power level of the mobile station is below a threshold power level.

4. The method of claim 1:
   wherein the radio access network is configured to initially page the mobile station in the zone of last registration, and then if unsuccessful, to page the mobile station in both the zone of last registration and a first expanded paging area; and
   wherein determining the location of the mobile station in relation to the zone of last registration comprises determining whether the mobile station is located in either (a) the zone of last registration or (b) the first expanded paging area.

5. The method of claim 1:
   wherein the radio access network is configured to: (a) initially page the mobile station in the zone of last registration, (b) then if unsuccessful, page the mobile station in both the zone of last registration and a first expanded paging area, and (c) then if again unsuccessful, page the mobile station in the zone of last registration, the first expanded paging area, and a second expanded paging area; and
   wherein determining the location of the mobile station in relation to the zone of last registration comprises determining whether the mobile station is located in either:
      (a) the zone of last registration, (b) the first expanded paging area, or (c) the second expanded paging area.

6. The method of claim 5, wherein using the location of the mobile station in relation to the zone of last registration as a basis for determining the scan period comprises:
   if the mobile station is located in the zone of last registration, then determining the scan period to be a duration of three paging-channel slot cycles;
   if the mobile station is located in the first expanded paging area, then determining the scan period to be a duration of two paging-channel slot cycles; and
   if the mobile station is located in the second expanded paging area, then determining the scan period to be a duration of one paging-channel slot cycle.

7. The method of claim 6, wherein the mobile station is assigned a slot in each paging-channel slot cycle in which the mobile station can scan the paging channel for a page from the radio access network, and wherein scanning the paging channel according to the determined scan period comprises:
   if the mobile station is located in the zone of last registration, then scanning the paging channel in the mobile station's assigned slot in every third paging-channel slot cycle;

if the mobile station is located in the first expanded paging area, then scanning the paging channel in the mobile station's assigned slot in every second paging-channel slot cycle; and if the mobile station is located in the second expanded paging area, then scanning the paging channel in the mobile station's assigned slot in every paging-channel slot cycle.

8. The method of claim 5:
wherein the first expanded paging area comprises one or more neighbor zones, wherein each neighbor zone is adjacent to the zone of last registration; and
wherein the second expanded paging area comprises all zones served by a switching system of the radio access network outside of the zone of last registration and the first expanded paging area.

9. The method of claim 5, further comprising the mobile station:
detecting that the mobile station has traveled into a zone in the first expanded paging area; and
while the mobile station is located in the zone first expanded paging area, the mobile station refraining from re-registering with the radio access network.

10. The method of claim 9, further comprising the mobile station:
detecting that the mobile station has traveled into a zone the second expanded paging area; and
while the mobile station is located in the zone in the second expanded paging area, the mobile station continuing to refrain from re-registering with the radio access network.

11. The method of claim 9, further comprising the mobile station:
detecting that the mobile station has traveled into a zone in the second expanded paging area; and
in response to determining that the mobile station is located in the zone in the second expanded paging area, the mobile station re-registering in the zone in the second expanded paging area.

12. The method of claim 1, further comprising the mobile station initially receiving a zone-information message from a radio access network, wherein a given switch provides service in a coverage area that comprises a plurality of zones that includes the zone of last registration, wherein each of the plurality of zones comprises one or more sectors, and wherein the zone-information message comprises an indication of the location of each of the sectors in relation to the zone of registration; and
wherein determining the location of the mobile station in relation to the zone of last registration comprises:
determining a sector in which the mobile station is currently located; and
determining the location of the mobile station in relation to a zone of last registration to be the location of the sector in which the mobile station is currently located in relation to a zone of last registration.

13. A method comprising:
a mobile station determining a battery-power level of the mobile station, wherein the mobile station has most-recently registered with a radio access network in a zone of last registration, and wherein the zone of last registration is a paging zone in the radio access network;
the mobile station determining whether the determined battery-power level is below a threshold level;
if the determined battery-power level is above the threshold level, then the mobile station selecting a first scanning process;

if the determined battery-power level is below the threshold level, then the mobile station selecting a second scanning process, wherein the second scanning process varies a period between scans of a paging channel based at least in part on a location of the mobile station in relation to the zone of last registration, wherein the location of the mobile station in relation to a zone of last registration is determined based on a location of a current paging zone in which the mobile station is located in relation to the zone of last registration, and wherein the current paging zone is a paging zone in the radio access network; and
scanning the paging channel according to the selected scanning process.

14. The method of claim 13, wherein the mobile station is assigned a slot in each paging-channel slot cycle in which the mobile station can scan the paging channel for a page from the radio access network, wherein the radio access network is configured to: (a) initially page the mobile station in the zone of last registration, (b) then if unsuccessful, page the mobile station in a first expanded paging area, and (c) then if again unsuccessful, page the mobile station in a second expanded paging area; and wherein the second scanning process comprises:
the mobile station determining whether the mobile station is located in either: (a) the zone of last registration, (b) the first expanded paging area, or (c) the second expanded paging area; and
if the mobile station is located in the zone of last registration, then the mobile station scanning the paging channel in the mobile station's assigned slot in every third paging-channel slot cycle;
if the mobile station is located in the first expanded paging area, then the mobile station scanning the paging channel in the mobile station's assigned slot in every second paging-channel slot cycle; and
if the mobile station is located in the second expanded paging area, then the mobile station scanning the paging channel in the mobile station's assigned slot in every paging-channel slot cycle.

15. A mobile-station system comprising:
a non-transitory tangible computer-readable medium; and
program instructions stored on the non-transitory tangible computer-readable medium and executable by at least one processor to:
(a) determine a location of the mobile station in relation to a zone of last registration, wherein the mobile station last registered with the radio access network in the zone of last registration, wherein the zone of last registration is a paging zone in the radio access network, wherein the location of the mobile station in relation to a zone of last registration is determined based a location of a current paging zone in which the mobile station is located in relation to the zone of last registration, and wherein the current paging zone is a paging zone in the radio access network;
(b) use the location of the mobile station in relation to the zone of last registration as a basis to determine a scan period to wait between scans of a paging channel for a page from the radio access network; and
(c) cause the mobile station to periodically scan the paging channel according to the determined scan period.

16. The mobile-station system of claim 15, further comprising program instructions stored on the non-transitory tangible computer-readable medium and executable by at least one processor to:

make a determination that a mobile station should switch to operation in a power-save mode; and in response to the determination that the mobile station should switch to operation in the power-save mode:
  cause the mobile station carry out (a)-(b); and
  cause the mobile station to carry out (c) while the mobile station is in the power-save mode.

17. The mobile-station system of claim 15:
wherein the radio access network is configured to: (a) initially page the mobile station in the zone of last registration, (b) then if unsuccessful, page the mobile station in both the zone of last registration and a first expanded paging area, and (c) then if again unsuccessful, page the mobile station in the zone of last registration, the first expanded paging area, and a second expanded paging area; and wherein the program instructions stored on the non-transitory tangible computer-readable medium and executable by at least one processor to determine the location of the mobile station in relation to the zone of last registration comprise program instructions stored on the non-transitory tangible computer-readable medium and executable by at least one processor to determine whether the mobile station is located in either: (a) the zone of last registration, (b) the first expanded paging area, or (c) the second expanded paging area; and wherein the program instructions stored on the non-transitory tangible computer-readable medium and executable by at least one processor to use the location of the mobile station in relation to the zone of last registration as a basis to determine the scan period comprise program instructions stored on the non-transitory tangible computer-readable medium and executable by at least one processor to:
  if the mobile station is located in the zone of last registration, then determine the scan period to be a duration of three paging-channel slot cycles;
  if the mobile station is located in the first expanded paging area, then determine the scan period to be a duration of two paging-channel slot cycles; and
  if the mobile station is located in the second expanded paging area, then determine the scan period to be a duration of one paging-channel slot cycle.

18. The mobile-station system of claim 17, wherein the mobile station is assigned a slot in each paging-channel slot cycle in which the mobile station can scan the paging channel for a page from the radio access network, and wherein the program instructions stored on the non-transitory tangible computer-readable medium and executable by at least one processor to scan the paging channel according to the determined scan period comprise program instructions stored on the non-transitory tangible computer-readable medium and executable by at least one processor to:
  if the mobile station is located in the zone of last registration, then scan the paging channel in the mobile station's assigned slot in every third paging-channel slot cycle;
  if the mobile station is located in the first expanded paging area, then scan the paging channel in the mobile station's assigned slot in every second paging-channel slot cycle; and
  if the mobile station is located in the second expanded paging area, then scan the paging channel in the mobile station's assigned slot in every paging-channel slot cycle.

19. The mobile-station system of claim 17, further comprising program instructions stored on the non-transitory tangible computer-readable medium and executable by at least one processor to:
  detect when the mobile station travels into the first expanded paging area; and
  responsively cause the mobile station to refrain from re-registering with the radio access network while the mobile station is located in the first expanded paging area.

20. The mobile-station system of claim 19, further comprising program instructions stored on the non-transitory tangible computer-readable medium and executable by at least one processor to, while the mobile station is operating in the power-save mode:
  detect when the mobile station has travels into a zone in the second expanded paging area; and
  responsively cause the mobile station to re-register with the radio access network, wherein the mobile station re-registers in the zone in the second expanded paging area.

* * * * *